United States Patent
Galford et al.

(10) Patent No.: US 9,964,665 B2
(45) Date of Patent: May 8, 2018

(54) GAMMA-RAY SPECTROMETER CALIBRATION SYSTEMS AND METHODS

(71) Applicant: Halliburton Energy Services, Inc., Houston, TX (US)

(72) Inventors: James E. Galford, Missouri City, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 15/026,874

(22) PCT Filed: Mar. 26, 2015

(86) PCT No.: PCT/US2015/022694
§ 371 (c)(1),
(2) Date: Apr. 1, 2016

(87) PCT Pub. No.: WO2016/153514
PCT Pub. Date: Sep. 29, 2016

(65) Prior Publication Data
US 2017/0276831 A1    Sep. 28, 2017

(51) Int. Cl.
*G01V 13/00* (2006.01)
*G01V 5/08* (2006.01)
*G01T 7/00* (2006.01)
*G01T 1/36* (2006.01)

(52) U.S. Cl.
CPC .............. *G01V 13/00* (2013.01); *G01T 1/362* (2013.01); *G01T 7/005* (2013.01); *G01V 5/08* (2013.01)

(58) Field of Classification Search
CPC .......... G01T 1/362; G01T 7/005; G01V 13/00; G01V 5/08
See application file for complete search history.

(56) References Cited

U.S. PATENT DOCUMENTS

| 5,475,727 A | 12/1995 | Buchanan et al. |
| 7,005,646 B1 * | 2/2006 | Jordanov ................ G01T 1/208 250/207 |
| 7,049,598 B1 | 5/2006 | Jordanov et al. |

(Continued)

FOREIGN PATENT DOCUMENTS

| WO | WO-2010139370 A1 | 12/2010 |
| WO | WO-2012130335 A1 | 10/2012 |
| WO | WO-2014023954 A1 | 2/2014 |

OTHER PUBLICATIONS

"International Application Serial No. PCT/US2015/022694, International Search Report dated Nov. 12, 2015", 3 pgs.

(Continued)

*Primary Examiner* — Mark R Gaworecki
(74) *Attorney, Agent, or Firm* — Haynes and Boone, LLP

(57) ABSTRACT

A gamma-ray spectrometer calibration system comprises a light guide, a photomultiplier tube, a laser, and analysis electronics. The light guide is optically coupled to the scintillation crystal, the laser and the photomultiplier tube, such that the laser can provide reference signals to the photomultiplier tube. In some embodiments, one or more temperature sensors are provided, such that the analysis electronics determine initial settings and adjust the initial settings based on the temperatures measured by the temperature sensors. Additional apparatus, methods, and systems are disclosed.

20 Claims, 6 Drawing Sheets

(56) References Cited

U.S. PATENT DOCUMENTS

| | | | |
|---|---|---|---|
| 7,157,681 B1 * | 1/2007 | Tetzlaff | H01J 43/04 250/205 |
| 2005/0269513 A1 | 12/2005 | Ianakiev et al. | |
| 2008/0111079 A1 | 5/2008 | Stein et al. | |
| 2009/0114829 A1 | 5/2009 | He et al. | |
| 2011/0101232 A1 * | 5/2011 | Stein | G01T 1/20 250/370.11 |
| 2011/0186721 A1 | 8/2011 | Galford | |
| 2011/0211675 A1 | 9/2011 | Ramsden | |
| 2013/0324844 A1 * | 12/2013 | Knowland | A61B 6/4258 600/431 |
| 2014/0021355 A1 | 1/2014 | Fukuda et al. | |
| 2014/0077073 A1 * | 3/2014 | Vu | G01T 1/40 250/252.1 |
| 2015/0212218 A1 * | 7/2015 | Manslow | G01T 1/362 378/207 |
| 2015/0316665 A1 * | 11/2015 | Ramsden | G01T 1/40 378/207 |
| 2016/0174920 A1 * | 6/2016 | Lacey | A61B 6/4266 378/189 |

OTHER PUBLICATIONS

"International Application Serial No. PCT/US2015/022694, Written Opinion dated Nov. 12, 2015", 12 pgs.

"International Application Serial No. PCT/US2015/022710, International Search Report dated Nov. 12, 2015", 3 pgs.

"International Application Serial No. PCT/US2015/022710, Written Opinion dated Nov. 12, 2015", 11 pgs.

"International Application Serial No. PCT/US2015/022721, International Search Report dated Nov. 30, 2015", 3 pgs.

"International Application Serial No. PCT/US2015/022721, Written Opinion dated Nov. 30, 2015", 9 pgs.

* cited by examiner

US 9,964,665 B2

GAMMA-RAY SPECTROMETER CALIBRATION SYSTEMS AND METHODS

PRIORITY APPLICATION

This application is a U.S. National Stage Filing under 35 U.S.C. 371 from International Application No. PCT/US2015/022694, filed Mar. 26, 2015; which application is incorporated herein by reference in its entirety.

CROSS-REFERENCE TO RELATED PATENT DOCUMENTS

This patent application is related to PCT Application Serial Number PCT/US2015/022710, filed on even date herewith, entitled GAMMA-RAY SPECTROMETER CALIBRATION SYSTEMS AND METHODS naming James E. Galford and Weijun Guo as inventors and to PCT Application Serial Number PCT/US2015/022721, filed on even date herewith, entitled PHOTOPEAK LOCATION SYSTEMS AND METHODS naming James E. Gafford and Weijun Guo as inventors, both of which are hereby incorporated by reference in their entirety.

BACKGROUND

Natural gamma-ray elemental concentrations provide information that is valuable for petrophysical purposes. For example, thorium and potassium are useful for mineral identification, especially when combined with other logging measurements. As a further example, zones with high uranium concentrations can be used to identify volcanic zones, and in many organic shale reservoirs, uranium content often correlates with total organic carbon content. Various methods have been developed to derive these elemental concentrations from pulse-height natural gamma-ray spectra. However, deviations from the desired calibration can occur for a variety of reasons. Voltage drifts caused by changes in electronics due to changes in temperature can lead to deviations in both gain and channel offset. Similarly, light output from most scintillation crystals varies with changes in crystal temperature which, in turn, affects the gain of the detector system. In addition, aging of the photomultiplier cathode can cause the spectrometer gain to change over time. For some detector systems a phenomenon known as photomultiplier fatigue occurs when large counting rate changes occur over short intervals of time. In well logging, spectrometers are often operated for long periods of time, and it is not uncommon for the gain to change because of some or all of these effects.

A variety of techniques have been developed in an attempt to compensate for departures from the desired energy scale calibration of gamma-ray spectroscopy measurements. Some conventional techniques involve continuously monitoring the location of a photopeak, requiring that one or more identifiable photopeaks be present in the observed spectra. Other techniques introduce a known source of gamma rays into the detector system to be superimposed on the spectrum produced by gamma rays external to the spectrometer. However, small inaccuracies in determining the known source's location in the spectrum can lead to gain adjustments that magnify errors at larger gamma ray energies. Further, adding chemical sources often creates a number of safety, security, regulatory, and environmental concerns.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

FIGS. 1-8 illustrate example systems and methods for calibration of a gamma-ray spectrometer. A laser (e.g., a low-power semiconductor laser) is located proximate to a light guide of a down-hole gamma-ray spectrometer, so that photons from the laser can be directed to the light-sensitive elements of a photomultiplier tube of the gamma-ray spectrometer to produce reference signals. Analysis electronics analyze the reference signals relative to a spectrum to calculate, and adjust for, gain and channel offset. The analysis electronics may further adjust the current applied to the laser and the voltage applied to the photomultiplier tube to calibrate the gamma-ray spectrometer. In some embodiments, the analysis electronics operate to calibrate the gamma-ray spectrometer by adjusting the power supplied to the laser based on a temperature of the laser, indicated by a sensor proximate to the laser.

In some embodiments, the gamma-ray spectrometer calibration systems and methods operate independently of a communication link with a surface data acquisition unit. In at least one embodiment, the systems and methods allow for calibration of a multi-channel pulse-height gamma-ray spectrometer for well logging instruments detecting natural gamma rays or scattered gamma rays as practiced in density logging. In some embodiments, the systems and methods are used for diagnostic measurements performed on the surface at the well site or in a laboratory. Further, in some embodiments the systems and methods are used to calibrate measured pulse-height spectra obtained from gamma-gamma reactions. The systems and methods may be used with instruments for wireline or logging while drilling (LWD) applications.

Figure 1:
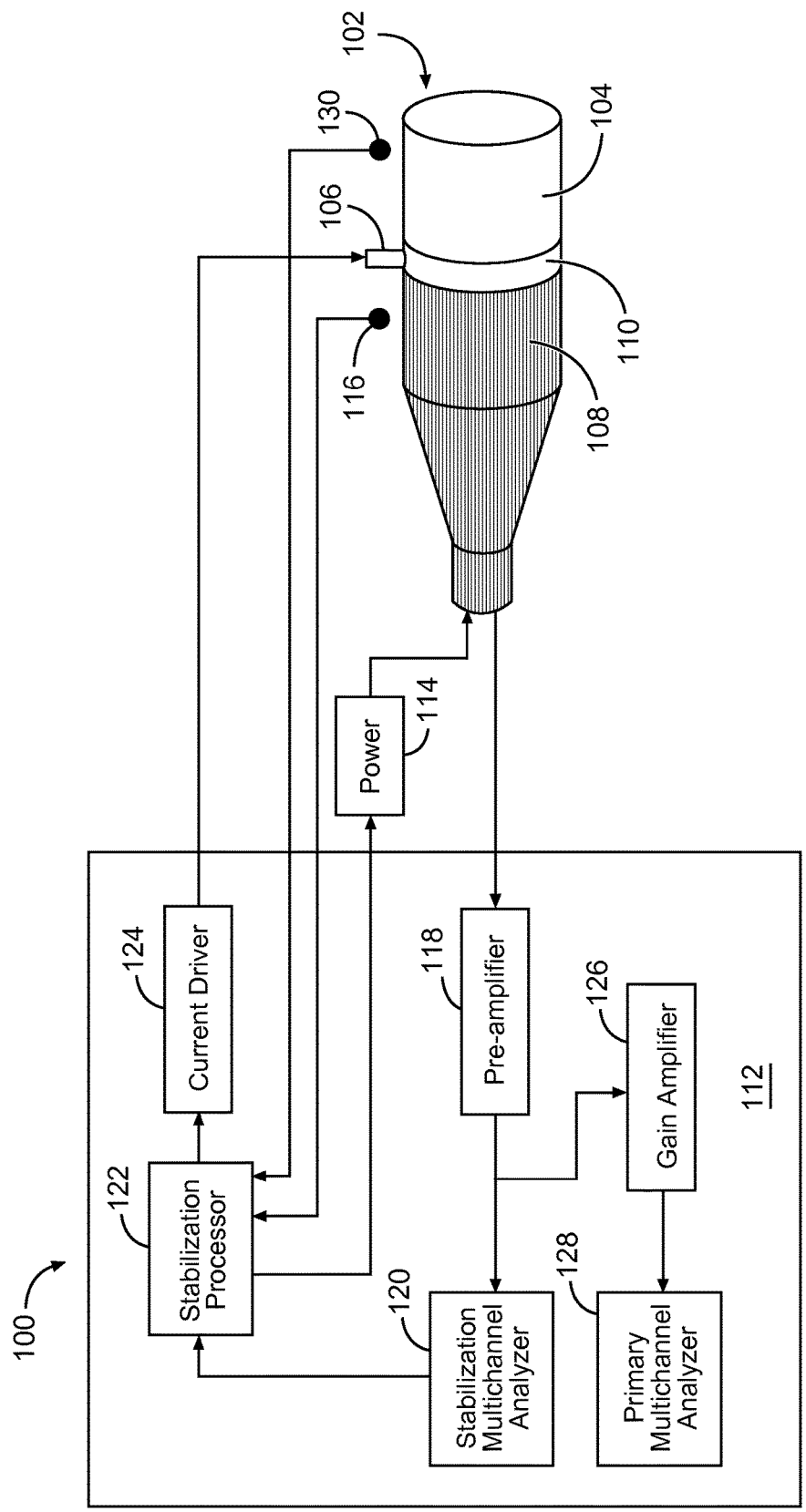
FIG. 1 depicts an example gamma-ray spectrometer calibration system, in accordance with some embodiments.

FIG. 1 depicts an example gamma-ray spectrometer calibration system 100 comprising a gamma-ray spectrometer 102 that is to measure gamma-ray energy, in accordance with some embodiments. The gamma-ray spectrometer calibration system 100 comprises a scintillation crystal 104, a laser 106, a photomultiplier tube 108, a light guide 110, analysis electronics 112, a power supply 114, and one or more temperature sensors 116, 130. The scintillation crystal 104 is optically coupled to the photomultiplier tube 108 via the light guide 110. The light guide 110 provides an optical connection through which photons arising from radiation interactions in the scintillation crystal 104 can be sensed by the light-sensitive photomultiplier tube 108. The laser 106 is located proximate to the light guide 110 such that photons from the laser 106 can also be directed to the light-sensitive elements of the photomultiplier tube 108. That is, the laser 106 is optically coupled to the photomultiplier tube 108. In at least one embodiment, the laser 106 is a semiconductor laser, for example a low-power semiconductor laser.

For example, in some embodiments, the laser 106 may comprise one or more low-power class II or class IIIA semiconductor lasers. Laser 106 may be selected based on any of a number of criteria. For example, the wavelength of the light output of the laser 106 should be chosen to match the sensitivity of the photomultiplier tube 108. For example, in at least one embodiment, the laser 106 operates in the 300-700 nanometer range, such as GaN UV (370 nm) or InxGaxN (400-480 nm) blue semiconductor lasers.

Different configurations of the light guide 110 are provided in some embodiments. For example, in at least one embodiment the laser 106 may be embedded within the light guide 110 coupling the scintillation crystal 104 to the photomultiplier tube 108. In some embodiments, the light guide 110 comprises fiber optical light guides embedded in the coupling between the scintillation crystal 104 and the photomultiplier tube 108, such that light from the laser 106 is directed to the light-sensitive components of the photomultiplier tube 108 through the fiber optical light guides.

The laser 106 pulses or otherwise emits light toward the light guide 110 of the gamma-ray spectrometer 102 to induce one or more reference signals. The photomultiplier tube 108 provides the one or more reference signals for the analysis electronics 112 to analyze relative to a spectrum. The analysis electronics 112 operate to calibrate the gamma-ray spectrometer 102 based on the analysis of the reference signals. For example, in at least one embodiment, the analysis electronics 112 operate to calibrate the gamma-ray spectrometer 102 to compensate for changes in gain, changes in offset, or both changes in gain and changes in offset. In at least one embodiment, the analysis electronics 112 operate to calibrate the gamma-ray spectrometer 102 by determining initial settings (for example, start-up settings for the gamma-ray spectrometer 102), updated settings, or a combination of initial settings and updated settings. In some embodiments, the analysis electronics 112 operate to calibrate the gamma-ray spectrometer 102 responsive to a signal provided by the temperature sensor 116 indicating a temperature proximate to the laser 106, or the temperature sensor 130 indicating a temperature proximate to the scintillation crystal 104, or both. In at least one embodiment, the analysis electronics 112 operate to calibrate the gamma-ray spectrometer 102 by adjusting power supplied to the laser 106, in some embodiments, the analysis electronics 112 operate to calibrate the gamma-ray spectrometer by adjusting the power supplied to the photomultiplier tube 108 by the power supply 114. The power supply 114 may further supply power to any one or more of the components of the gamma-ray spectrometer calibration system 100.

In at least one embodiment, the analysis electronics 112 comprise a preamplifier 118. The preamplifier 118 processes the signal produced by the photomultiplier tube 108 for processing by a stabilization multichannel analyzer 120. The stabilization multichannel analyzer 120, of the analysis electronics 112, generates a spectrum or spectra based on one or more signals produced by the photomultiplier tube 108 as a result of radiation interactions in the scintillation crystal 104. The analysis electronics 112 further comprise a stabilization processor 122. The stabilization processor 122 receives the accumulated spectra and the reference signals from the stabilization multichannel analyzer 120 and analyzes the reference signals relative to the one or more spectra. For example, in at least one embodiment, the stabilization processor 122 identifies the location of reference peaks generated by the reference signals to determine gain and channel offset. The stabilization processor 122 controls generation of light pulses from the laser 106 via a current driver 124. In at least one embodiment, the stabilization processor 122 receives a signal from one or more of the temperature sensors 116, 130 and adjusts the generation of light pulses from the laser 106 via the current driver 124 based on the signal from one or more of the temperature sensors 116, 130. In some embodiments, the stabilization processor 122 adjusts the power supplied to the photomultiplier 108 via the power supply 114. For example, calibration of the gamma-ray spectrometer 102 may comprise adjusting a voltage provided by the power supply 114 to the photomultiplier tube 108. For example, in at least one embodiment, the stabilization processor 118 adjusts the voltage setting according to a function of the observed locations of the reference photopeaks (produced by the photomultiplier tube 108 in response to the light pulses from the laser 106) in the accumulated spectra.

Maintaining calibration under varying operating conditions in some embodiments comprises a closed control loop that includes the stabilization multichannel analyzer 120 (e.g., a stabilization multichannel pulse-height analyzer), the stabilization processor 122, the current driver 124, and the temperature sensors 116, 130. In some embodiments, the closed control loop further comprises the preamplifier 118, such that output pulses from the photomultiplier tube 108 may be directed through the preamplifier 118 to the stabilization multichannel analyzer 120. In at least one embodiment, signals from the preamplifier 118 are passed through a gain amplifier 126 and a primary multichannel analyzer 128. Because the reference photopeaks produce signals that are above the energy range of interest for detected gamma rays, in at least one embodiment, pulse-height spectra for the intended measurement is recorded on an expanded energy scale relative to the stabilization pulse-height spectra. The gain amplifier 126 applies additional gain amplification to the output pulses from the pre-amplifier 118 before they are passed to the primary multichannel analyzer 128. In such a configuration, the signals from the reference photopeaks may exceed the range of the primary multichannel analyzer 128 and would therefore not be counted.

Figure 2:
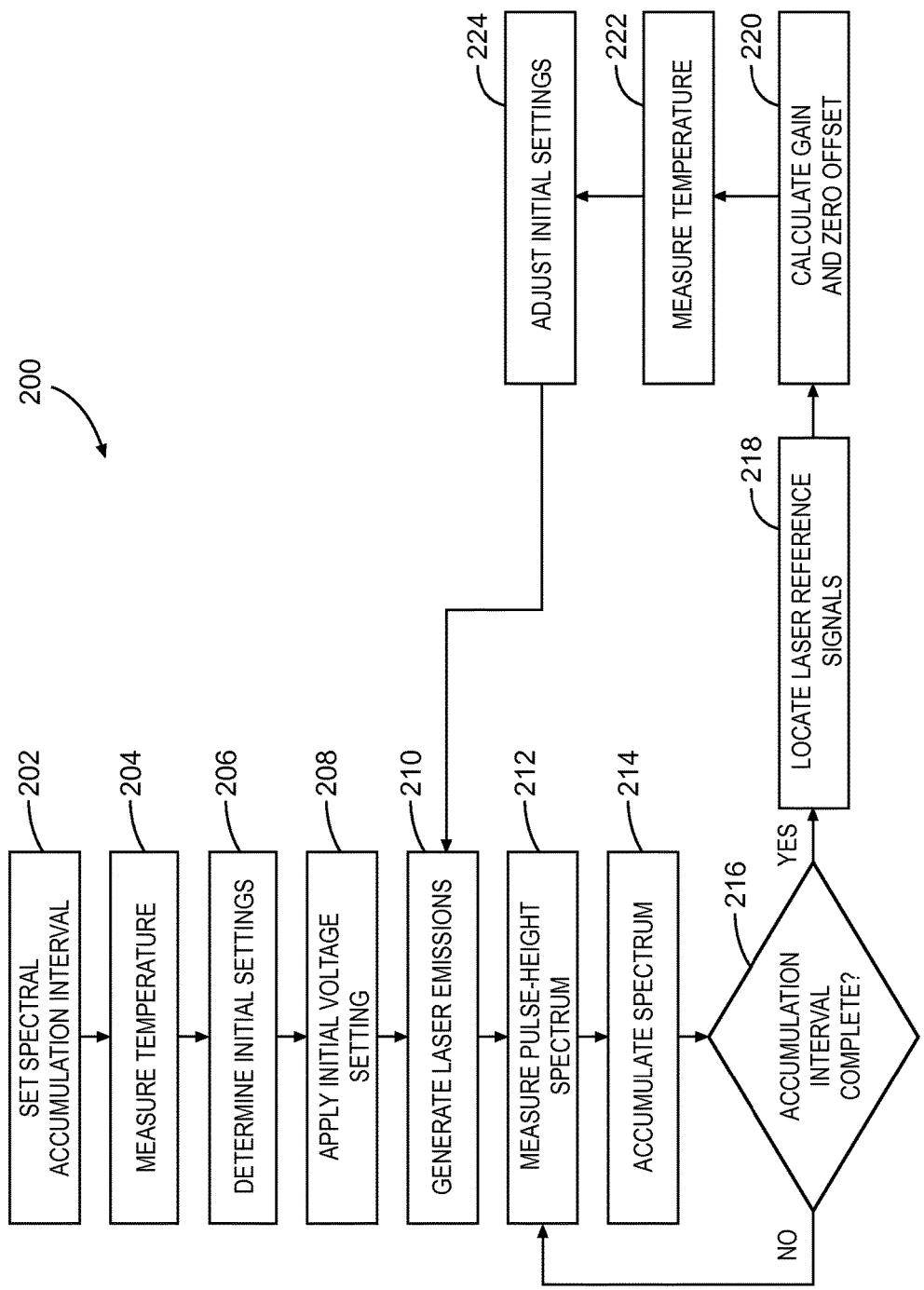
FIG. 2 is a flow diagram of an example method of gamma-ray spectrometer calibration, in accordance with some embodiments.

FIG. 2 is a flow diagram of an example method 200 of gamma-ray spectrometer calibration, in accordance with some embodiments. As a matter of convenience, the method 200 is described with reference to the gamma-ray spectrometer calibration system 100 of FIG. 1. At block 202, the analysis electronics 112 set a spectral accumulation interval. Various embodiments may comprise different spectral accumulation intervals. For example, in some embodiments, the spectral accumulation interval is chosen for a particular gamma-ray spectrometer 102 and application based on a nominal anticipated counting rate to obtain acceptable statistical precision.

At block 204, the analysis electronics 112 measure at least one temperature associated with the gamma-ray spectrometer calibration system 100. For example, in at least one embodiment, the analysis electronics 112 sample the temperature sensor 116 to measure a temperature of the laser 106 (or a temperature proximate to the laser 106). In at least one embodiment, the analysis electronics 112 sample the temperature sensor 130 to measure a temperature of the scintillation crystal 104 (or a temperature proximate to the scintillation crystal). In at least one embodiment, the analysis electronics 112 measure both a temperature of the laser 106 and a temperature of the scintillation crystal 130.

At block 206, the analysis electronics 112 determine initial settings for the gamma-ray spectrometer 102. In at least one embodiment, the analysis electronics 112 calculate an initial current setting for the laser 106 based on the temperature of the laser 106, the temperature of the scintillation crystal 104, or both. In some embodiments, the analysis electronics 112 determine the initial current setting as a plurality of currents to be used according to a pulsing sequence to generate reference photopeaks. In at least one embodiment, the analysis electronics 112 determine an initial voltage setting for the photomultiplier tube 108 based on the temperature of the scintillation crystal 104. The initial settings for the gamma-ray spectrometer 102 are dependent on instrument temperature (e.g., the temperature of the laser 106 or the scintillation crystal 104, or both), which often cannot be anticipated ahead of time. As such, in at least one embodiment, the analysis electronics 112 selects the voltage setting based on an empirical relationship between photomultiplier tube voltage and scintillation crystal temperature. In some embodiments, the analysis electronics 112 determine both the initial current setting for the laser 106 and the initial voltage setting for the photomultiplier tube 108.

At block 208, the analysis electronics 112 apply the initial voltage setting to the gamma-ray spectrometer 102, via the power supply 114. The power supply 114 applies the initial voltage setting, for example a high voltage setting, to the photomultiplier tube 108. In at least one embodiment, the initial voltage setting comprises a high voltage setting of 600-800 volts. In at least one embodiment, the voltage setting depends on the operational characteristics of the photomultiplier tube 108. In at least one embodiment, the analysis electronics 112 calculate or otherwise determine the initial voltage setting based on empirical data in an effort to reduce the time it takes to calibrate the gamma-ray spectrometer 102 before logging or other operations can proceed. In at least one embodiment, the analysis electronics 112 control an initial gain setting of the gamma-ray spectrometer 102 upon power-up of the gamma-ray spectrometer 112, for example, by applying the initial voltage setting.

At block 210, the analysis electronics 112 generate laser emissions at the laser 106. For example, in at least one embodiment, the current driver 124 applies the initial current (determined at block 206) to the laser 106. The laser emission of light pulses, generated at the laser 106, comprises one or more reference photopeaks. The analysis electronics 112 may pulse the laser 106 at any time after high voltage has been applied to the photomultiplier tube to generate light pulses to induce the reference peaks. For example, in some embodiments, the analysis electronics 112 pulse the laser 106 prior to acquiring the spectrum, or concurrently with acquiring the spectrum, or both. The laser 106 produces light pulses without contributing down-scattered background that interferes with the measured spectra. Using the current driver 124, the analysis electronics 112 can pulse the laser 106 using different currents to generate some of the reference peaks. In at least one embodiment, the current driver 124 pulses the laser 106 according to a pulsing sequence comprising a plurality of current settings to create a plurality of reference photopeaks. In at least one embodiment, the light pulses from the laser 106 are directed toward the light guide 110, such that the light guide 110 directs photons from the laser 106 to the light-sensitive elements of the photomultiplier tube 108.

At block 212, the analysis electronics 112 measure the pulse-height spectrum. Output signals from the photomultiplier tube 108 are directed through the preamplifier 118 to the stabilization multichannel analyzer 120. In at least one embodiment, the analysis electronics 112 apply further gain amplification to the output signals of the photomultiplier tube 108 by directing the signals from the pre-amplifier 118 through the gain amplifier 126 and the primary multichannel analyzer 128.

At block 214, the analysis electronics 112, via the stabilization multichannel analyzer 120, accumulate the spectrum. After the initial voltage setting is applied to the photomultiplier tube 108 of the gamma-ray spectrometer 102, the stabilization multichannel analyzer 120 begins accumulating a pulse-height spectrum associated with an output of the photomultiplier tube 108. In at least one embodiment, the stabilization multichannel analyzer 120 acquires the spectrum by accumulating the pulse-height spectrum for a predetermined spectral accumulation interval.

At block 216, the analysis electronics 112 determine whether the accumulation interval is complete. The analysis electronics 112 compare the spectral accumulation interval set at block 202 with the spectra accumulated at block 214 to see if the accumulated spectra meet or exceed the specified spectral accumulation interval. If the accumulated spectra does not yet meet the spectral accumulation interval, the method 200 returns to block 212, to measure and accumulate additional spectra. If the accumulated spectra meets or exceeds the specified spectral accumulation interval, the method 200 proceeds to block 218.

At block 218, the analysis electronics 112 locate the reference signals generated by the laser 106. The stabilization processor 122 processes the accumulated spectra from the stabilization multichannel analyzer 120, and locates the one or more reference photopeaks (produced by the photomultiplier tube 108 in response to the light pulses from the laser 106) relative to the spectrum. In at least one embodiment, the analysis electronics 112 select an initial current for the current driver 124 to supply to the laser 106, such that the reference photopeaks do not interfere with detected gamma rays and the resulting spectra. In at least one embodiment, the reference photopeaks produce signals that are above the energy range of interest for detected gamma rays, and the spectra for the intended measurement is recorded on an expanded energy scale. In at least one embodiment, the reference peaks are measured as part of the accumulated spectrum, and the analysis electronics 112 analyze the accumulated spectrum to locate the reference photopeaks.

At block 220, the analysis electronics 112 calculate gain and channel offset. In at least one embodiment, the analysis electronics 112 calculate gain, channel offset, or both based on the one or more reference signals produced by the emissions of the laser 106. At block 222, the analysis electronics 112 measure at least one temperature associated with the gamma-ray spectrometer calibration system 100. For example, in at least one embodiment, the analysis electronics 112 sample the output provided by the temperature sensor 116 to measure a temperature of the laser 106 (or a temperature proximate to the laser 106). In at least one embodiment, the analysis electronics 112 sample the output of the temperature sensor 130 to measure a temperature of the scintillation crystal 104 (or a temperature proximate to the scintillation crystal). In at least one embodiment, the analysis electronics 112 measure both a temperature of the laser 106 and a temperature of the scintillation crystal 130. In some embodiments, the analysis electronics 112 sample the same sensor or sensors 116, 130 as were sampled by the analysis electronics 112 sample at block 204, to determine an updated temperature. For example, the temperature of the laser 106 may change as it continues to generate emissions, and the temperature of the scintillation crystal 104 may change when ambient conditions change.

At block 224, the analysis electronics 224 adjust the initial settings to produce adjusted settings. In at least one embodiment, the analysis electronics 112 determine and apply an updated current setting for the laser 106 based on the gain. In at least one embodiment, the analysis electronics 112 calculate and apply an updated current setting for the laser 106 based on the temperature (e.g., the temperature measured at block 222) of the laser 106, of the scintillation crystal 104, or of both. In at least one embodiment, the analysis electronics 112 determine the updated current setting for the laser 106 based on both the gain and one or more measured temperatures. In at least one embodiment, the analysis electronics 112 determine and apply an updated voltage setting for the photomultiplier tube 108 based on the gain. In at least one embodiment, the analysis electronics 112 determine and apply an updated voltage setting based on the temperature of the scintillation crystal 104. In at least one embodiment, the analysis electronics 112 determine and apply an updated voltage setting based on both the gain and one or more measured temperatures. In some embodiments, the analysis electronics 112 determine and apply an updated current setting and an updated voltage setting.

The method 200 is a closed-loop automatic calibration method, such that following block 224, the method 200 returns to block 210. As such, the analysis electronics 112 continue to measure the spectrum until the analysis electronics 112 stop the method 200, or the gamma-ray spectrometer calibration system 100 is otherwise turned off.

Figure 3:
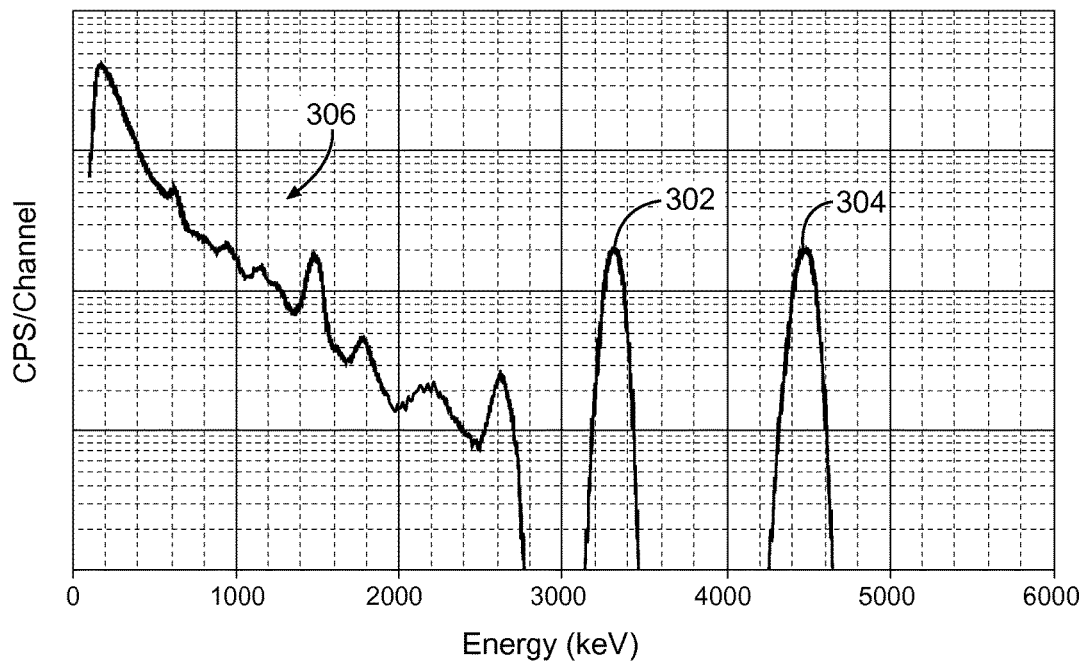
FIG. 3 is an example of a pulse-height spectrum indicating reference signals produced by a gamma-ray spectrometer calibration system, in accordance with some embodiments.

FIG. 3 is an example of a pulse-height spectrum indicating reference signals produced by a gamma-ray spectrometer calibration system (such as the gamma-ray spectrometer calibration system 100 of FIG. 1), in accordance with some embodiments. The gamma-ray spectrometer calibration system 100 generates reference signals via pulsing of the laser 106, such that the corresponding reference photopeaks 302, 304 do not interfere with the spectra of detected gamma rays 306. The analysis electronics 112 control the output light intensity of the laser 106 via the current driver 124, such that the light intensity associated with the reference photopeaks 302, 304 exceeds the expected energy domain of detected gamma rays 306. Conventional sources of reference signals result in down-scattered gamma rays, creating a background that interferes with the desired measured spectra. In contrast, the light pulses of the laser 106 create the reference photopeaks 302, 304 without contributing to the down-scattered background.

In at least one embodiment, since the reference photopeaks 302, 304 produce signals that are above the energy range of interest for detected gamma rays, the analysis electronics 112 record pulse-height spectra for the intended measurement on an expanded energy scale relative to the spectra recorded by the stabilization multichannel analyzer 120 and processed by the stabilization processor 122. Thus, in some embodiments, additional gain amplification may be applied (via the gain amplifier 126) to the output pulses from the pre-amplifier 118 before they are passed to the primary multichannel analyzer 128. In such a configuration, the signals from the reference photopeaks 302, 304 may exceed the range of the primary multichannel analyzer 128 and they would therefore not be counted. In at least one embodiment, two reference photopeaks 302, 304 are produced such that a complete, dynamic calibration of the gamma-ray spectrometer 102, i.e., gain and channel offset, is achieved through a feedback connection between the stabilization processor 122 and the stabilization multichannel analyzer 120.

Figure 4:
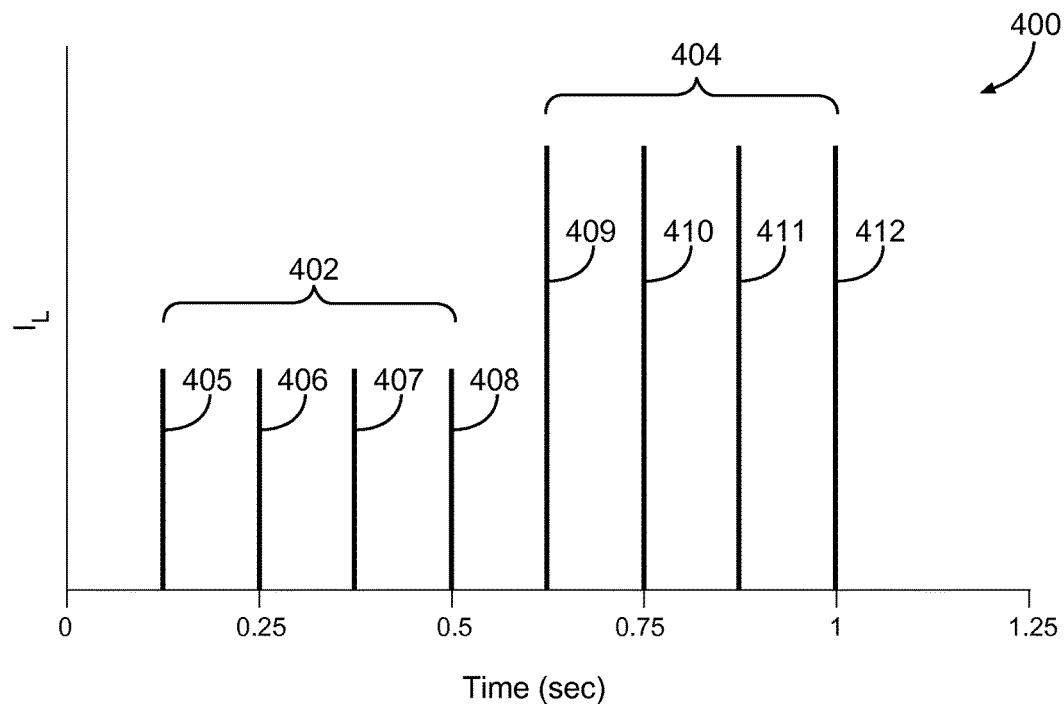
FIG. 4 depicts an example current pulse sequence, in accordance with some embodiments.

FIG. 4 depicts an example current pulse sequence 400, in accordance with some embodiments. For convenient reference, the current pulse sequence 400 is described with reference to the gamma-ray spectrometer calibration system 100 of FIG. 1 and the reference photopeaks 302, 304 of FIG. 3. The current pulse sequence 400 represents a plurality of pulses 405-412 of the laser 106 at different currents to induce reference signals. For example, in the illustrated embodiment, the current pulse sequence 400 comprises a first portion 402 of four pulses 405-408 and a second portion 404 of four pulses 409-412, indicating that the laser 106 is to be pulsed at a first current for the first portion 402 and at a second current for the second portion 404.

Pulsing the laser 106 at different current amplitudes results in different light output intensities from the laser 106, which generates multiple reference photopeaks. For example, in one embodiment, the first portion 402 corresponds with the first reference photopeak 302, and the second portion 404 corresponds with the second reference photopeak 304. That is, the reference photopeaks 302, 304 are generated by one or more of the pulses 405-412 of the laser 106 at the current designated by the corresponding portion 402, 404 of the current pulse sequence 400. In at least one embodiment, the current pulsing sequence 400 is chosen based on the desired laser reference photopeak amplitude in the spectrum 306, for example, based on the counting rate. The number of pulses 405-412 may vary for each portion 402, 404 and each current pulse sequence 400. Further, some embodiments may comprise different time intervals for the pulses 405-412. Additionally, embodiments of the current pulse sequence 400 may vary with regard to the currents associated with each portion 402, 404, as well as the number of portions 402, 404 included in the current pulse sequence 400.

In some embodiments, the duration and frequency of the pulses 405-412 applied to the laser 106 are comparable to the duration of scintillation pulses from the scintillation crystal 104 (e.g., to avoid contributing to the dead time of the gamma ray spectrometer 102 or distorting the spectrum by creating detector pile-up pulses). In at least one embodiment the duration of the pulses 405-412 are on the order of a microsecond or less, and the pulsing rate is a few cycles per second.

Figure 5:
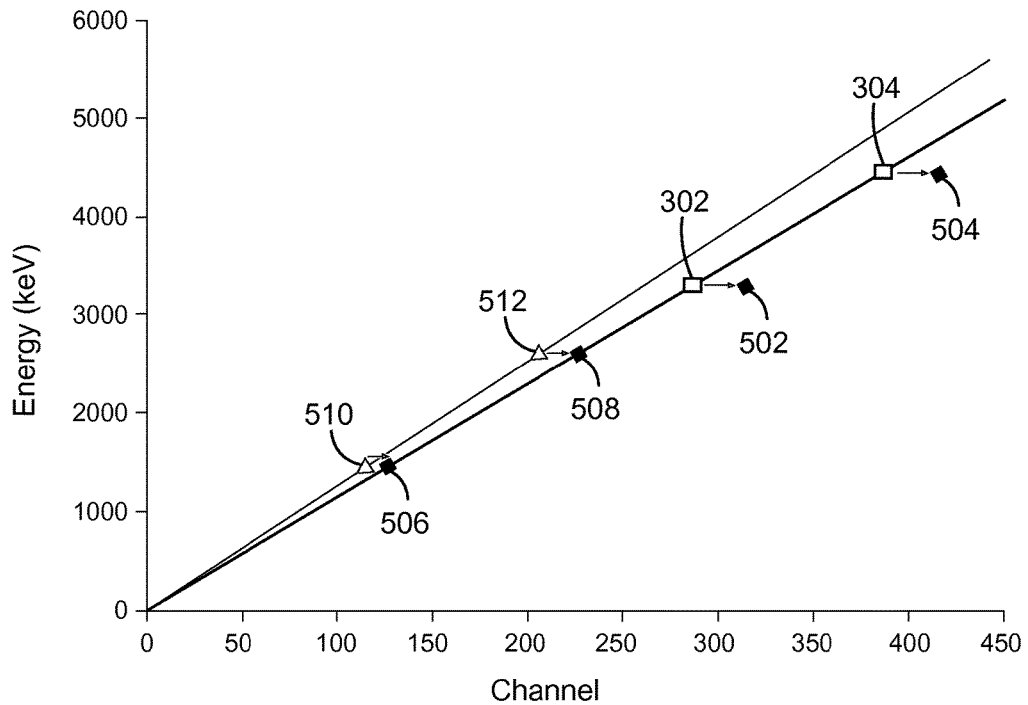
FIG. 5 is an example of a graph associated with channel-to-energy calibration, in accordance with some embodiments.

FIG. 5 is an example of a graph associated with channel-to-energy calibration, in accordance with some embodiments. For convenient reference, the graph of FIG. 5 is described with reference to the gamma-ray spectrometer calibration system 100 of FIG. 1 and the graph of FIG. 3. In at least one embodiment, emissions from the laser 106 in the form of light pulses are directed onto the photomultiplier tube 108 photocathode and are used to regulate the gain of the gamma-ray spectrometer 102. For example, in at least one embodiment, the gain of the gamma-ray spectrometer is controlled according to predetermined reference channel locations in the measured pulse-height spectrum. In the illustrated embodiment, two photopeaks 302, 304 produced by the laser 106 are shown relative to two photopeaks 506, 508 from natural gamma rays 306 when the gamma-ray spectrometer is operating at a first temperature. At the first temperature, calibration of the gamma-ray spectrometer 102 is achieved by maintaining the locations of the laser photopeaks 302, 304 in their current channel locations. However, if the gamma-ray spectrometer 102 is warmed to a second temperature, the gamma-ray spectrometer 102 will no longer be calibrated, because the two photopeaks 506, 508 from the natural gamma rays 306 will appear in smaller channel numbers (e.g., gamma-ray photopeaks 510, 512) as though they came from lower energy emissions. This occurs because the light output from the scintillation crystal 104 decreases at elevated temperatures.

To maintain calibration, the analysis electronics 112 adjusts the gain of the laser photopeaks 302, 304 to compensate for the light degradation of the scintillation crystal 104 at the second (elevated) temperature. The gain of the gamma-ray spectrometer 102, $G_{GR}$, in units of keV/channel can be expressed as:

$$G_{GR} = G_C(T_C) \times G_L \quad (1)$$

where $G_C(T_C)$ is a scintillation crystal gain correction factor that compensates for the reduction of the light output of the scintillation crystal 104 as a function of the crystal temperature, $T_C$; and $G_L$ is gain (e.g., the stabilization multichannel analyzer gain) calculated from the channel locations of the laser photopeaks 302, 304. The stabilization processor 122 locates central channels of laser photopeaks P1, P2 (302, 304) which correspond to predetermined gamma-ray energies, E1 and E2, respectively so that:

$$G_L = \frac{E2 - E1}{P2 - P1} \quad (2)$$

Similarly, the stabilization processor 122 evaluates the channel offset (e.g., the stabilization multichannel analyzer channel offset) from:

$$\text{Zero\_offset} = \frac{G_L P2 - E2}{G_L} \quad (3)$$

In Equation 3. $G_C(T_C)$ is derived from the light output response for the given crystal material of the scintillation crystal, so that:

$$G_C(T_C) = P_C(T_0)/P_C(T_C) \quad (4)$$

where $P_C(T_0)$ is the normalized output at reference temperature $T_0$, and $P_C(T_C)$ is the normalized light output at the current temperature of the scintillation crystal 104, $T_C$. In some embodiments, $T_0$ is near room temperature and chosen to coincide with a normalized light output of 1. A gain from the laser photopeaks, $G'_L$, can be computed that will produce the desired gamma-ray spectrum gain, $G'_{GR}$, by substituting Equation 4 into Equation 1 and rearranging terms:

$$G'_L = G'_{GR}/G_C(T_C) \quad (5)$$

The analysis electronics 112 update the locations of the reference laser photopeak locations, P1 and P2 (302, 304) to produce the desired laser photopeak gain given by Equation 5, such that the gamma-ray photopeaks will have the appropriate gain. The analysis electronics 112 translate the spectrum, such that reference laser photopeak P1 (302) moves to location P1' (502) and reference photopeak P2 (304) moves to location P2' (504). This also recalibrates the gamma-ray photopeak locations at the second temperature 510, 512 to compensated gamma-ray photopeak locations 506, 508.

In at least one embodiment, the calibration of the gamma-ray spectrometer 102 applies to the gamma-ray spectrum and the laser photopeaks, such that they share the same channel offset. Thus, the relocated laser photopeak locations, including the channel offset, may be calculated according to Equation 6 and Equation 7:

$$P1' = G_C(T_C) \times (P1 - \text{Zero\_offset}) + \text{Zero\_offset} \quad (6)$$

$$P2' = G_C(T_C) \times (P2 - \text{Zero\_offset}) + \text{Zero\_offset} \quad (7)$$

In some embodiments, the stabilization processor 122 adjusts the channel offset in addition to controlling the gain. In such an embodiment, the updated reference peak locations may be calculated according to Equation 8 and Equation 9:

$$P1' = G_C(T_C) \times (P1 - \text{Zero\_offset}) \quad (8)$$

$$P2' = G_C(T_C) \times (P2 - \text{Zero\_offset}) \quad (9)$$

Figure 6:
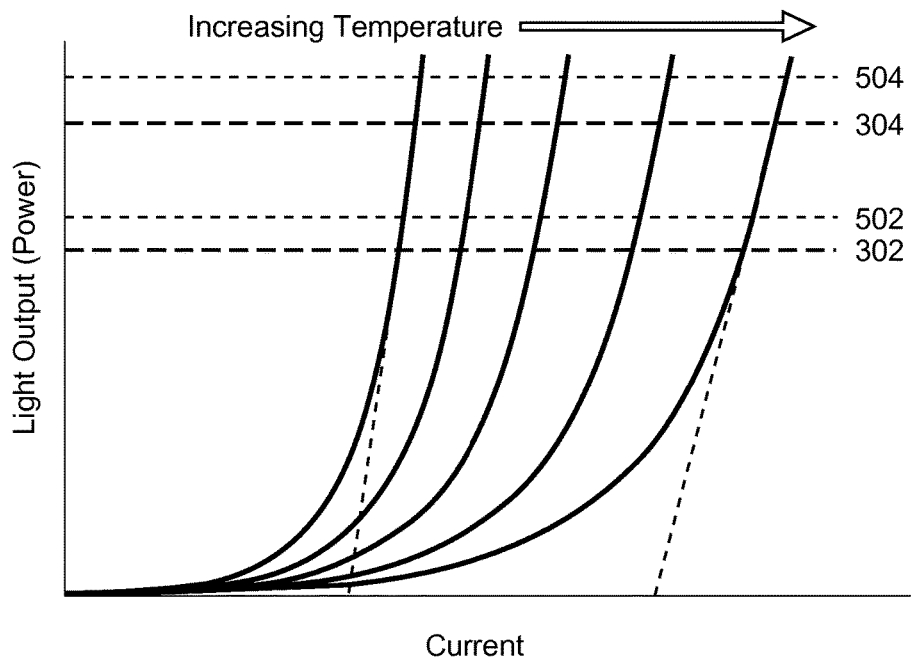
FIG. 6 is a graph indicating example light output of a laser relative to current supplied, in accordance with some embodiments.

FIG. 6 is a graph indicating example light output of a gamma-ray spectrometer relative to current supplied, in accordance with some embodiments. As a matter of convenience, the graph of FIG. 6 is described with reference to the gamma-ray spectrometer calibration system 100 of FIG. 1 and graph of FIG. 5. The stabilization processor 122 of the analysis electronics 112 controls the emission of light pulses from the laser 106 via the current driver 124. The intensity of the light output of the laser 106 is controlled by the current applied by the current driver 124 after a threshold current is exceeded. When operated below the threshold current level, the laser 106 produces spontaneous, incoherent light emissions similar to those provided by light-emitting diodes. In at least one embodiment, the gamma-ray spectrometer calibration system 100 operates the laser 106 via the current driver 124 at a current above the threshold current. That is, the analysis electronics 112 operate the laser 106 in coherent emission mode, such that the output light intensity is approximately linearly proportional to the applied current. In at least one embodiment, the analysis electronics 112 determine a pulsing sequence comprising a plurality of current settings above the threshold current. The plurality of current settings of the pulsing sequence generate a sequence of light pulses, creating a plurality of reference photopeaks in the spectra accumulated by the stabilization multichannel analyzer 120 to aid in calibration of the gamma-ray spectrometer 102.

In the illustrated embodiment, the stabilization processor 122 adjusts the current settings used in the pulsing sequence for the laser 106, based on the adjusted locations for the reference laser photopeaks 502, 504. Following the example, the adjusted photopeak locations 502, 504 would comprise increased laser current settings relative to the original laser photopeak locations 302, 304 to increase the light output from the laser 106.

The current setting adjustment for the laser 106 to adjust a laser photopeak location can be expressed in terms of the light output gain factor of the scintillation crystal 104. $G_C(T_C)$, and the temperature of the laser 106, with a slope governed by the relationship of the slope of the stimulated emission region of the operating curves ($\Delta P/\Delta I$) and laser temperature.

Figure 7:
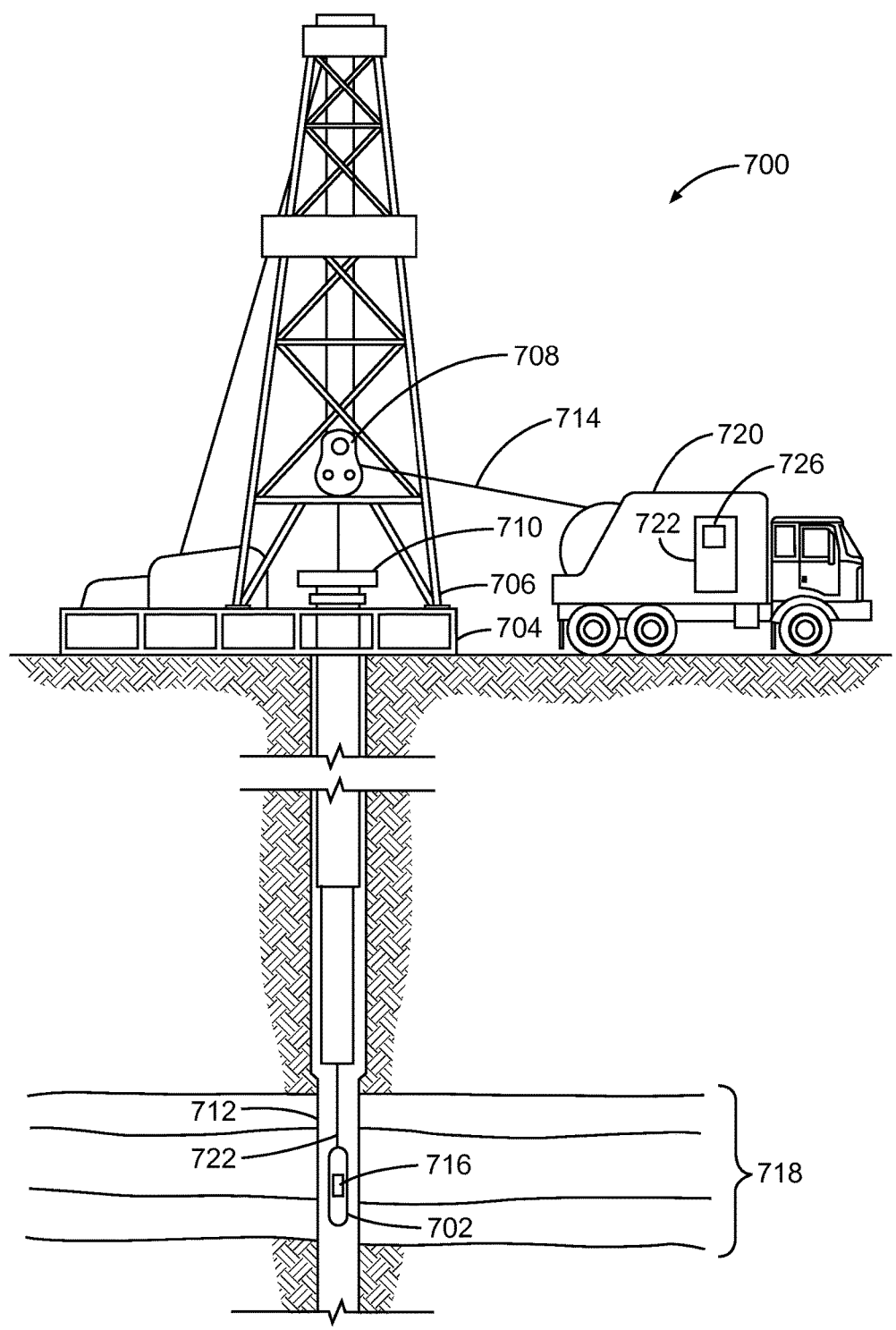
FIG. 7 depicts an example system at a wireline site, in accordance with some embodiments.
Figure 8:
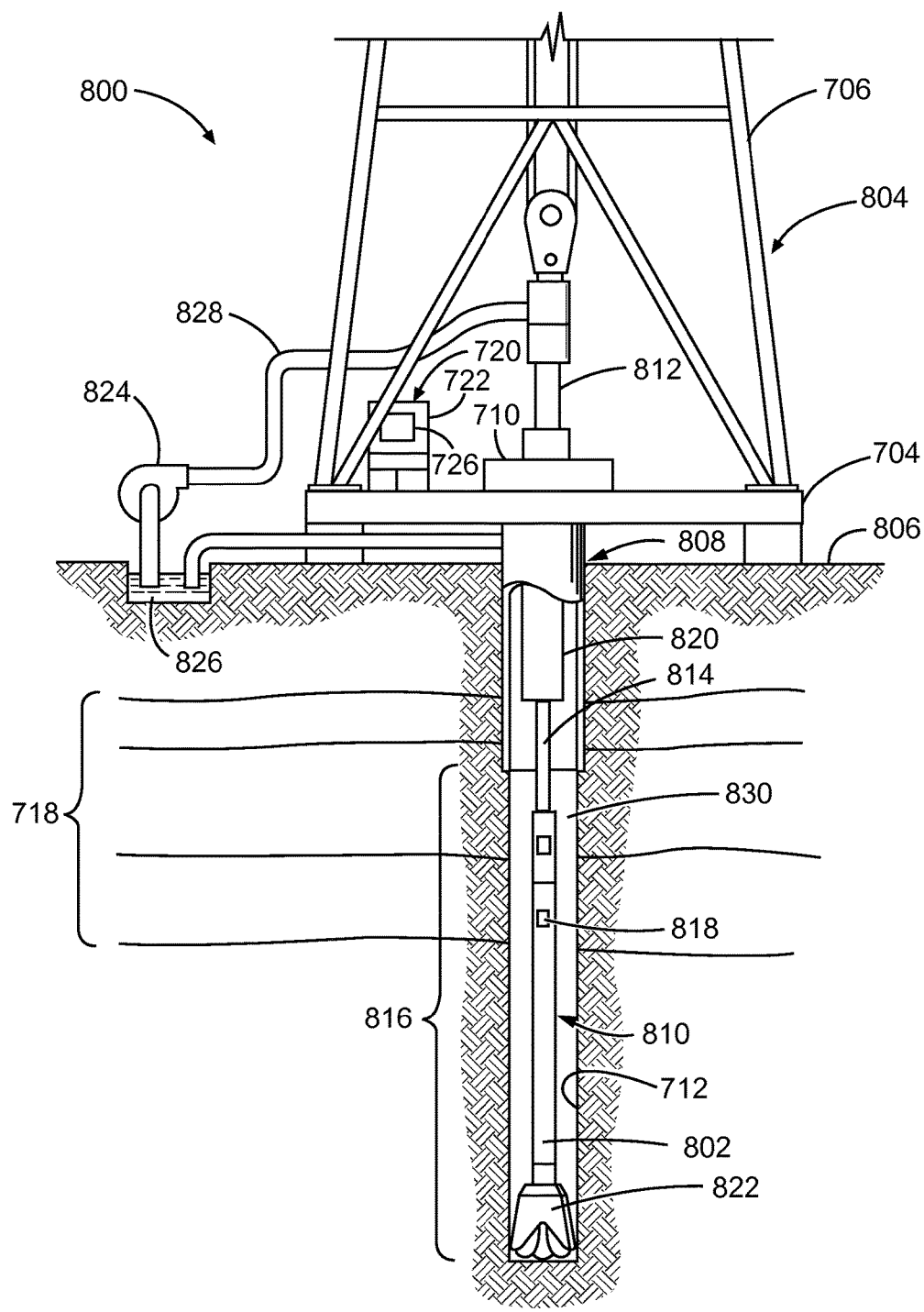
FIG. 8 depicts an example system at a drilling site, in accordance with some embodiments.

FIG. 7 is a diagram showing a wireline system 700 embodiment, and FIG. 8 is a diagram showing a logging while drilling (LWD) system 800 embodiment. The systems 700, 800 may thus comprise portions of a wireline logging tool body 702 as part of a wireline logging operation, or of a down hole tool 802 as part of a down hole drilling operation.

FIG. 7 illustrates a well used during wireline logging operations. In this case, a drilling platform 704 is equipped with a derrick 706 that supports a hoist 708. Drilling oil and gas wells is commonly carried out using a string of drill pipes connected together so as to form a drillstring that is lowered through a rotary table 710 into a wellbore or borehole 712. Here it is assumed that the drillstring has been temporarily removed from the borehole 712 to allow a wireline logging tool body 702, such as a probe or sonde, to be lowered by wireline or logging cable 714 (e.g., slickline cable) into the borehole 712. Typically, the wireline logging tool body 702 is lowered to the bottom of the region of interest and subsequently pulled upward at a substantially constant speed. The tool body 702 may include gamma-ray spectrometer calibration system 716 (which may include any one or more of the elements of FIG. 1).

During the upward trip, at a series of depths various instruments (e.g., the gamma-ray spectrometer calibration system 716 included in the tool body 702) may be used to perform measurements on the subsurface geological formations 718 adjacent to the borehole 712 (and the tool body 702). The measurement data can be communicated to a surface logging facility 720 for processing, analysis, and/or storage. The processing and analysis may include natural gamma-ray spectroscopy measurements and/or determination of formation density. The logging facility 720 may be provided with electronic equipment for various types of signal processing, which may be used by any one or more of the components of the gamma-ray spectrometer calibration system 716. Similar formation evaluation data may be gathered and analyzed during drilling operations (e.g., during LWD/MWD (measurement while drilling) operations, and by extension, sampling while drilling).

In some embodiments, the tool body 702 is suspended in the wellbore by a wireline cable 714 that connects the tool to a surface control unit (e.g., comprising a workstation 722). The tool may be deployed in the borehole 712 on coiled tubing, jointed drill pipe, hard wired drill pipe, or any other suitable deployment technique.

Referring to FIG. 8, it can be seen how a system 800 may also form a portion of a drilling rig 804 located at the surface 806 of a well 808. The drilling rig 804 may provide support for a drillstring 810. The drillstring 810 may operate to penetrate the rotary table 710 for drilling the borehole 712 through the subsurface formations 718. The drillstring 810 may include a Kelly 812, drill pipe 814, and a bottom hole assembly 816, perhaps located at the lower portion of the drill pipe 814. As can be seen in the figure, the drillstring may include a gamma-ray spectrometer calibration system 818 (which may include any one or more of the elements of FIG. 1).

The bottom hole assembly 816 may include drill collars 820, a down hole tool 802, and a drill bit 822. The drill bit 822 may operate to create the borehole 712 by penetrating the surface 806 and the subsurface formations 718. The down hole tool 802 may comprise any of a number of different types of tools including MWD tools, LWD tools, and others.

During drilling operations, the drillstring 810 (perhaps including the Kelly 812, the drill pipe 814, and the bottom hole assembly 816) may be rotated by the rotary table 710. Although not shown, in addition to, or alternatively, the bottom hole assembly 816 may also be rotated by a motor (e.g., a mud motor) that is located down hole. The drill collars 820 may be used to add weight to the drill bit 822. The drill collars 820 may also operate to stiffen the bottom hole assembly 816, allowing the bottom hole assembly 816 to transfer the added weight to the drill bit 822, and in turn, to assist the drill bit 822 in penetrating the surface 806 and subsurface formations 718.

During drilling operations, a mud pump 824 may pump drilling fluid (sometimes known by those of ordinary skill in the art as "drilling mud") from a mud pit 826 through a hose 828 into the drill pipe 814 and down to the drill bit 822. The drilling fluid can flow out from the drill bit 822 and be returned to the surface 806 through an annular area 830 between the drill pipe 814 and the sides of the borehole 712. The drilling fluid may then be returned to the mud pit 826, where such fluid is filtered. In some embodiments, the drilling fluid can be used to cool the drill bit 822, as well as to provide lubrication for the drill bit 822 during drilling operations. Additionally, the drilling fluid may be used to remove subsurface formation cuttings created by operating the drill bit 822.

The workstation 722 and the controller 726 may include modules comprising hardware circuitry, a processor, and/or memory circuits that may store software program modules and objects, and/or firmware, and combinations thereof, as desired by the architect of the gamma-ray spectrometer calibration system 716, 818 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

In some embodiments, a method comprises measuring, at a first sensor, a first temperature of a laser; measuring, at a second sensor, a first temperature of a scintillation crystal associated with a gamma-ray spectrometer; and determining an initial current setting for the laser based on the first temperature of the laser and the first temperature of the scintillation crystal.

In some embodiments, a method further comprises determining a voltage setting for a photomultiplier tube optically coupled to the laser, based on the first temperature of the scintillation crystal.

In some embodiments, determining the voltage setting comprises selecting the voltage setting based on an empirical relationship between photomultiplier tube voltage and scintillation crystal temperature.

In some embodiments, a method further comprises generating, at the laser, a laser emission comprising one or more reference signals; calculating gain of the gamma-ray spectrometer based on the one or more laser reference signals; and determining an updated current setting for the laser based on the gain.

In some embodiments, a method further comprises generating, at the laser, a laser emission as one or more reference signals; calculating a channel offset of the gamma-ray spectrometer based on the one or more reference signals; and determining an updated voltage setting for a photomultiplier tube optically coupled to the laser based on the channel offset.

In some embodiments, a method further comprises measuring a second temperature of the laser; and determining an updated current setting for the laser based on the second temperature of the laser.

In some embodiments, a method further comprises measuring a second temperature of the scintillation crystal; and determining an updated current setting for the laser based on the second temperature of the scintillation crystal.

In some embodiments, a method further comprises controlling an initial gain setting of the gamma-ray spectrometer upon power-up of the gamma-ray spectrometer.

In some embodiments, a system comprises a scintillation crystal; a light guide optically coupled to the scintillation crystal; a photomultiplier tube coupled to the light guide; a laser optically coupled to the light guide to provide reference signals to the photomultiplier tube; and analysis electronics to determine a laser current setting, in conjunction with a gamma-ray spectrometer coupled to receive signals representing emissions from the scintillation crystal when the crystal is excited by gamma rays, based on a temperature of the laser.

In some embodiments, a system further comprises a sensor proximate to the laser, wherein the sensor is to measure the temperature of the laser.

In some embodiments, a system further comprises a sensor proximate to the scintillation crystal, wherein the sensor is to measure a temperature of the scintillation crystal.

In some embodiments, the analysis electronics are to determine the laser current setting based on the temperature of the scintillation crystal.

In some embodiments, the analysis electronics are to determine a voltage setting for the photomultiplier tube based on the temperature of the scintillation crystal.

In some embodiments, a method comprises measuring a first temperature associated with a system to measure gamma ray energy, the system comprising a gamma-ray spectrometer; determining initial settings for the gamma-ray spectrometer based on the first temperature; measuring a second temperature associated with the system; and adjusting the initial settings for the gamma-ray spectrometer based on the second temperature to calibrate the gamma-ray spectrometer.

In some embodiments, measuring the first temperature comprises measuring a temperature of a laser included in the system; and determining initial settings for the gamma-ray spectrometer comprises determining an initial current setting for the laser.

In some embodiments, a method further comprises measuring a temperature of a scintillation crystal included in the system, wherein the initial current setting is determined based on the temperature of the scintillation crystal.

In some embodiments, measuring the first temperature comprises measuring a temperature of a scintillation crystal included in the system; and determining initial settings for the gamma-ray spectrometer comprises determining an initial voltage for the gamma-ray spectrometer.

In some embodiments, measuring the second temperature comprises measuring a temperature of a laser included in the system and optically coupled to a photomultiplier tube; and adjusting the initial settings for the gamma-ray spectrometer comprises determining an updated current setting for the laser.

In some embodiments, a method further comprises measuring a temperature of a scintillation crystal included in the system, wherein the updated current setting is determined based on the temperature of the scintillation crystal when the scintillation crystal is excited by gamma rays.

In some embodiments, measuring the second temperature comprises measuring a temperature of a scintillation crystal included in the system; and adjusting the initial settings for the gamma-ray spectrometer comprises determining an updated voltage for the gamma-ray spectrometer.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   measuring, at a first sensor, a first temperature of a laser;
   measuring, at a second sensor, a first temperature of a scintillation crystal associated with a gamma-ray spectrometer;
   determining an initial current setting for the laser based on the first temperature of the laser and the first temperature of the scintillation crystal; and
   applying the initial current to the laser.

2. The method of claim 1, further comprising:
   determining a voltage setting for a photomultiplier tube optically coupled to the laser, based on the first temperature of the scintillation crystal.

3. The method of claim 2, wherein determining the voltage setting comprises selecting the voltage setting based on an empirical relationship between photomultiplier tube voltage and scintillation crystal temperature.

4. The method of claim 1, further comprising:
generating, at the laser, a laser emission comprising one or more reference signals;
calculating gain of the gamma-ray spectrometer based on the one or more laser reference signals; and
determining an updated current setting for the laser based on the gain.

5. The method of claim 1, further comprising:
generating, at the laser, a laser emission as one or more reference signals;
calculating a channel offset of the gamma-ray spectrometer based on the one or more reference signals; and
determining an updated voltage setting for a photomultiplier tube optically coupled to the laser based on the channel offset.

6. The method of claim 1, further comprising:
measuring a second temperature of the laser; and
determining an updated current setting for the laser based on the second temperature of the laser.

7. The method of claim 1, further comprising:
measuring a second temperature of the scintillation crystal; and
determining an updated current setting for the laser based on the second temperature of the scintillation crystal.

8. The method of claim 1, further comprising:
controlling an initial gain setting of the gamma-ray spectrometer upon power-up of the gamma-ray spectrometer.

9. A system, comprising:
a scintillation crystal;
a light guide optically coupled to the scintillation crystal;
a photomultiplier tube coupled to the light guide;
a laser optically coupled to the light guide to provide reference signals to the photomultiplier tube; and
analysis electronics to determine a laser current setting, in conjunction with a gamma-ray spectrometer coupled to receive signals representing emissions from the scintillation crystal when the crystal is excited by gamma rays, based on a temperature of the laser.

10. The system of claim 9, further comprising a sensor proximate to the laser, wherein the sensor is to measure the temperature of the laser.

11. The system of claim 9, further comprising a sensor proximate to the scintillation crystal, wherein the sensor is to measure a temperature of the scintillation crystal.

12. The system of claim 11, wherein the analysis electronics are to determine the laser current setting based on the temperature of the scintillation crystal.

13. The system of claim 11, wherein the analysis electronics are to determine a voltage setting for the photomultiplier tube based on the temperature of the scintillation crystal.

14. A method, comprising:
measuring a first temperature of a gamma-ray spectrometer;
determining initial settings for the gamma-ray spectrometer based on the first temperature;
measuring a second temperature of the gamma-ray spectrometer; and
adjusting the initial settings for the gamma-ray spectrometer based on the second temperature to adjust a calibration of the gamma-ray spectrometer.

15. The method of claim 14, wherein:
measuring the first temperature comprises measuring a temperature of a laser included in the gamma-ray spectrometer; and
determining initial settings for the gamma-ray spectrometer comprises determining an initial current setting for the laser.

16. The method of claim 15, further comprising:
measuring a temperature of a scintillation crystal included in the system, wherein the initial current setting is determined based on the temperature of the scintillation crystal.

17. The method of claim 14, wherein:
measuring the first temperature comprises measuring a temperature of a scintillation crystal included in the gamma-ray spectrometer; and
determining initial settings for the gamma-ray spectrometer comprises determining an initial voltage for the gamma-ray spectrometer.

18. The method of claim 14, wherein:
measuring the second temperature comprises measuring a temperature of a laser included in the gamma-ray spectrometer and optically coupled to a photomultiplier tube; and
adjusting the initial settings for the gamma-ray spectrometer comprises determining an updated current setting for the laser.

19. The method of claim 18, further comprising measuring a temperature of a scintillation crystal included in the gamma-ray spectrometer, wherein the updated current setting is determined based on the temperature of the scintillation crystal when the scintillation crystal is excited by gamma rays.

20. The method of claim 14, wherein:
measuring the second temperature comprises measuring a temperature of a scintillation crystal included in the gamma-ray spectrometer; and
adjusting the initial settings for the gamma-ray spectrometer comprises determining an updated voltage for the gamma-ray spectrometer.

* * * * *